United States Patent
Van Zandt

(10) Patent No.: US 12,258,059 B2
(45) Date of Patent: Mar. 25, 2025

(54) ELEVATED PIVOT BRACKET FOR A WHEELBARROW

(71) Applicant: Douglas Van Zandt, White Salmon, WA (US)

(72) Inventor: Douglas Van Zandt, White Salmon, WA (US)

( * ) Notice: Subject to any disclaimer, the term of this patent is extended or adjusted under 35 U.S.C. 154(b) by 0 days.

(21) Appl. No.: 18/646,098

(22) Filed: Apr. 25, 2024

(65) Prior Publication Data

US 2024/0270297 A1 Aug. 15, 2024

Related U.S. Application Data

(60) Continuation of application No. 17/444,975, filed on Aug. 12, 2021, now Pat. No. 11,970,197, which is a division of application No. 15/903,004, filed on Feb. 22, 2018, now Pat. No. 11,285,982.

(60) Provisional application No. 62/462,107, filed on Feb. 22, 2017.

(51) Int. Cl.
B62B 1/24 (2006.01)
B62B 1/22 (2006.01)

(52) U.S. Cl.
CPC .......... *B62B 1/24* (2013.01); *B62B 1/22* (2013.01); *B62B 2203/05* (2013.01)

(58) Field of Classification Search
CPC .... B62B 1/18; B62B 1/20; B62B 1/22; B62B 1/24; B62B 1/204; B62B 1/23; B62B 2203/05
See application file for complete search history.

(56) References Cited

U.S. PATENT DOCUMENTS

| | | | | |
|---|---|---|---|---|
| 3,282,600 A | * | 11/1966 | Tonelli | B62B 1/18 280/47.31 |
| 3,950,005 A | * | 4/1976 | Patterson | B62B 5/04 188/29 |
| 4,190,260 A | * | 2/1980 | Pearce | B62B 1/18 280/755 |
| 4,270,786 A | * | 6/1981 | Mattox | B62B 1/24 298/3 |
| 5,026,079 A | * | 6/1991 | Donze | B62B 1/20 280/47.33 |
| 5,033,760 A | * | 7/1991 | Evans | B62B 1/20 D34/16 |
| 5,087,061 A | * | 2/1992 | Wallace | B62B 1/20 280/30 |
| 5,106,113 A | * | 4/1992 | Piacentini | B62B 1/22 301/128 |
| 5,149,116 A | * | 9/1992 | Donze | B62B 1/22 D34/16 |

(Continued)

OTHER PUBLICATIONS

Roofmaster 4 × 8 Double Wheelbarrow Long Steel Handle (roofingdirect.com) (Last viewed on Aug. 2, 2021).

(Continued)

*Primary Examiner* — Jeffrey J Restifo
(74) *Attorney, Agent, or Firm* — Downs Rachlin Martin PLLC

(57) ABSTRACT

A pivot bracket for a wheelbarrow having a bight with a ground-engaging portion positioned so as to enable a large pivoting angle of the wheelbarrow. In some preferred embodiments, the ground engaging portion is positioned forward of the wheel of the wheelbarrow and above the axis of rotation of the wheel.

20 Claims, 8 Drawing Sheets

(56) References Cited

U.S. PATENT DOCUMENTS

| | | | | |
|---|---|---|---|---|
| 5,242,177 A * | 9/1993 | Morris | B62B 5/0089 | |
| | | | D34/27 | |
| 5,509,681 A * | 4/1996 | Keller | B62B 1/20 | |
| | | | 280/415.1 | |
| 5,531,463 A * | 7/1996 | Givens | B62B 1/22 | |
| | | | 280/767 | |
| 5,810,375 A * | 9/1998 | Hoffarth | B62B 5/068 | |
| | | | 298/3 | |
| 5,924,708 A * | 7/1999 | Bisaillon | B62B 1/18 | |
| | | | 298/2 | |
| 6,886,838 B1 * | 5/2005 | Zimmerman | B62B 1/22 | |
| | | | 298/3 | |
| 6,908,088 B2 * | 6/2005 | Feick | B62B 1/18 | |
| | | | 298/3 | |
| 7,866,686 B2 * | 1/2011 | Conaway | B62B 1/208 | |
| | | | 280/653 | |
| 7,900,939 B2 * | 3/2011 | Robinson | B62B 1/18 | |
| | | | 280/654 | |
| 7,934,728 B2 * | 5/2011 | Strobel | B62B 1/183 | |
| | | | 280/654 | |
| 8,997,658 B2 * | 4/2015 | Pipkorn | B62B 5/0013 | |
| | | | 108/42 | |
| 8,998,221 B1 | 4/2015 | Frenkel | | |
| 10,124,820 B2 * | 11/2018 | Meyer | B62B 5/0006 | |
| 10,322,736 B1 * | 6/2019 | Duffin | B62B 1/18 | |
| 10,683,023 B1 * | 6/2020 | Cook | B62B 5/0066 | |
| 10,919,554 B1 * | 2/2021 | Vaverek | B62B 3/12 | |
| 11,027,760 B1 * | 6/2021 | Day | B62B 1/206 | |
| 2002/0113388 A1 * | 8/2002 | Robinson | B62B 1/206 | |
| | | | 280/47.31 | |
| 2002/0195783 A1 * | 12/2002 | Robinson | B62B 1/206 | |
| | | | 280/47.31 | |
| 2003/0006570 A1 * | 1/2003 | Baker | B62B 1/18 | |
| | | | 280/47.17 | |
| 2008/0277889 A1 * | 11/2008 | Strobel | B62B 1/18 | |
| | | | 280/47.31 | |
| 2009/0295109 A1 * | 12/2009 | Winter | B62B 1/22 | |
| | | | 280/47.34 | |
| 2010/0201091 A1 * | 8/2010 | Easterling | B62B 1/20 | |
| | | | 29/281.5 | |
| 2011/0139038 A1 * | 6/2011 | Pipkorn | B62B 1/20 | |
| | | | 108/25 | |
| 2017/0282947 A1 * | 10/2017 | Meyer | B62B 1/186 | |
| 2018/0237045 A1 * | 8/2018 | Van Zandt | B62B 1/22 | |
| 2019/0380534 A1 * | 12/2019 | Patterson | B62B 1/18 | |
| 2021/0114641 A1 * | 4/2021 | Chenge | B62B 1/206 | |
| 2021/0291885 A1 * | 9/2021 | Foreman | B62B 5/0066 | |
| 2022/0017131 A1 * | 1/2022 | Hopkins | B62B 1/18 | |
| 2022/0105974 A1 * | 4/2022 | De Luca | B62B 5/0433 | |
| 2022/0274635 A1 * | 9/2022 | Zhang | B62B 5/0069 | |
| 2023/0391387 A1 * | 12/2023 | Foley | B62B 1/20 | |
| 2024/0132128 A1 * | 4/2024 | Vesely | B62B 5/005 | |

OTHER PUBLICATIONS

Roofmaster 18 × 850 Single Wheelbarrow With Long Steel Handle (roofingdirect.com) (Last viewed on Aug. 2, 2021).

Miller Wheelbarrows (wlmd.com) (Last viewed on Aug. 2, 2021).

GroundWork Steel Wheelbarrow, 400 lb. Capacity, WB6024-BF at Tractor Supply Co. (https://www.tractorsupply.com/ tsc/product/groundwork-6-cu-ft-steel-wheelbarrow) (Last viewed on Aug. 2, 2021).

Jescraft Steel Wheelbarrows | Single or Dual Wheel | Carts and Dollies—Diamond Tool Store. https://diamondtoolstore.com/products/jescraft-all-welded-steel-wheelbarrows (Last viewed on Aug. 2, 2021).

Jescraft SWA-610 All Welded Wheelbarrow—Single Wheel with 16" Pneumatic Tire (toolfetch.com) (Last viewed on Aug. 2, 2021).

Excavator 6 Cu. Ft. Wheelbarrow, Steel Tray & Handles—Standard Knobby Tire (https://seymourmidwest.com/85730/) (Last viewed on Mar. 24, 2022).

EasyLifter Wheelbarrow by Corona / Corona Tools. EasyLifter - 6 Cubic Ft FF (https://shop.coronatoolsusa.com/easyliftertm-6-cubic-ft-ff.html) (Last viewed on Mar. 24, 2022).

* cited by examiner

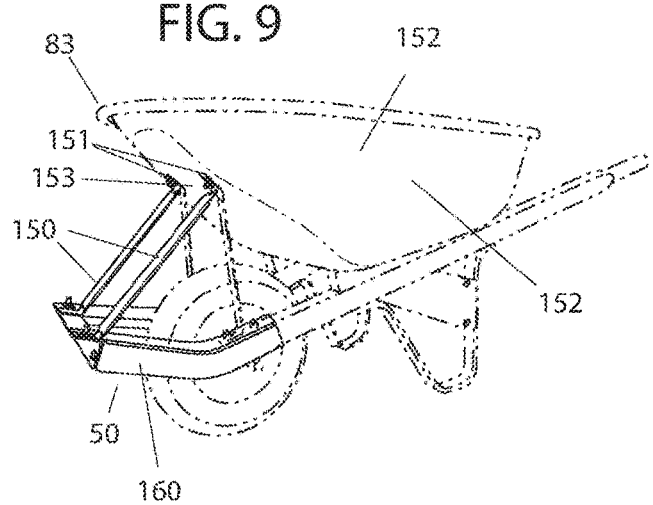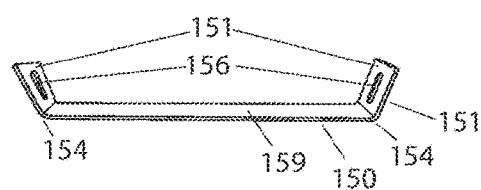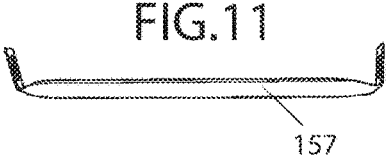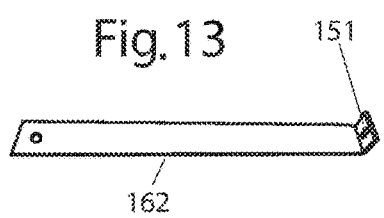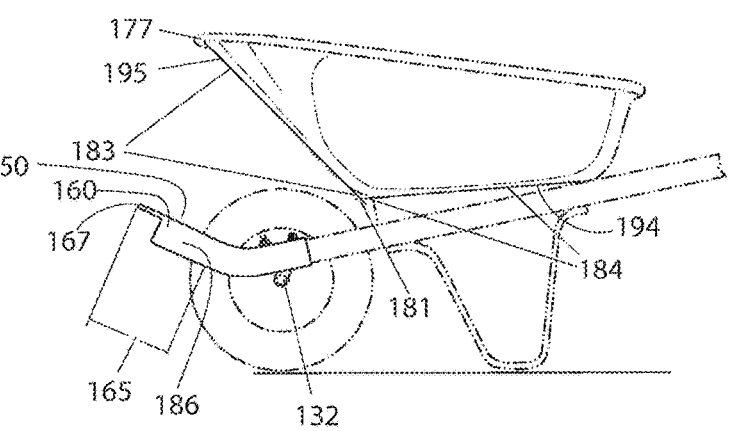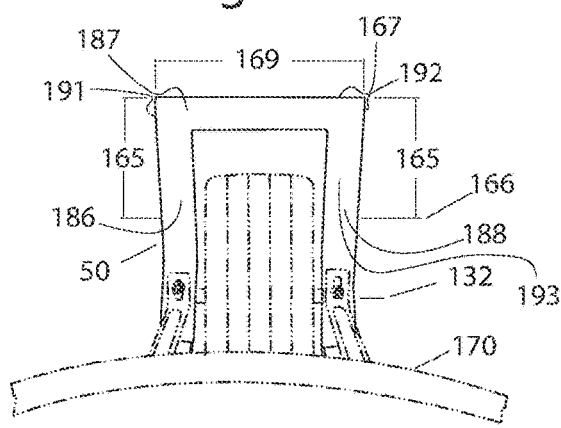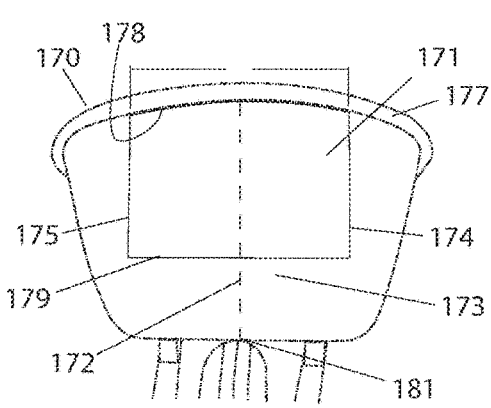

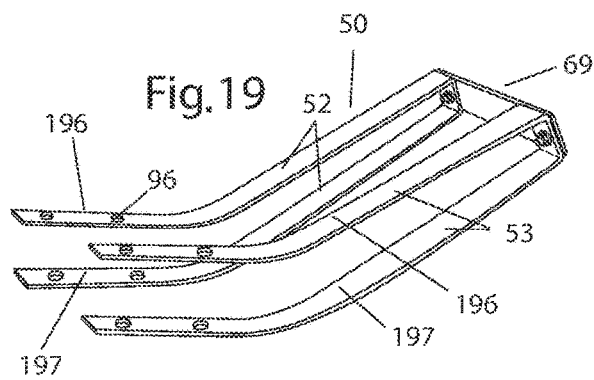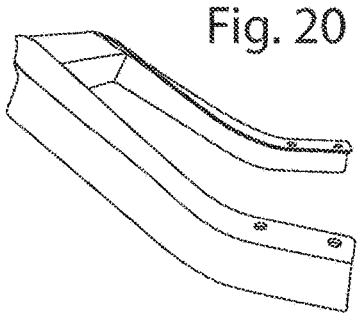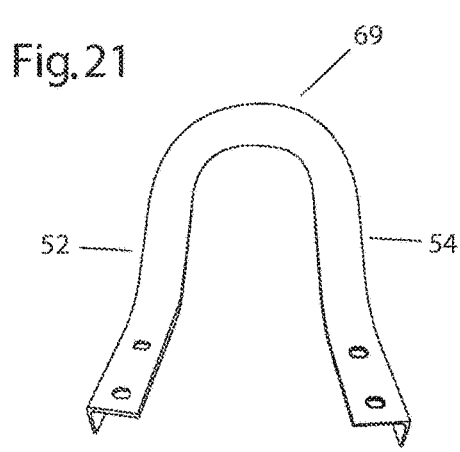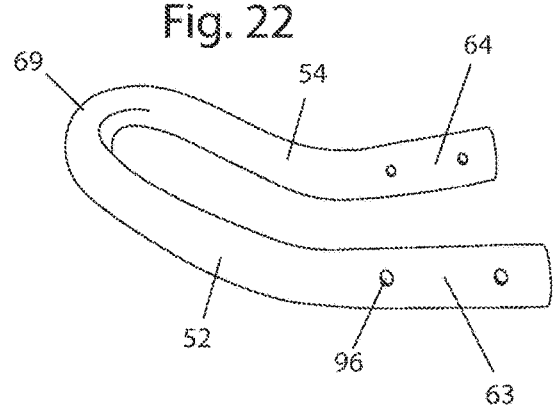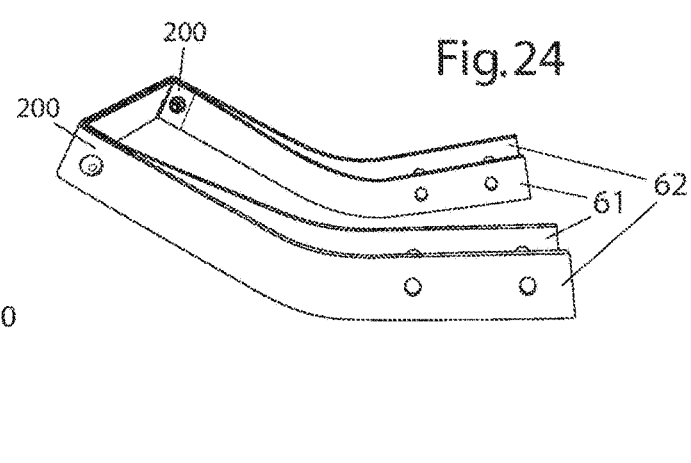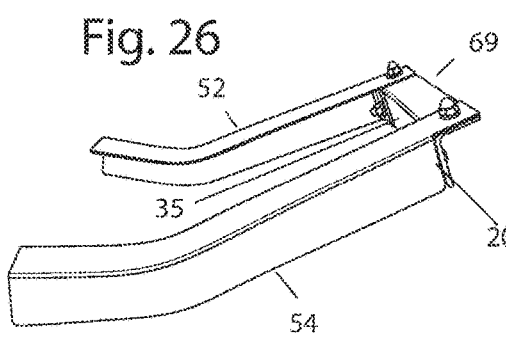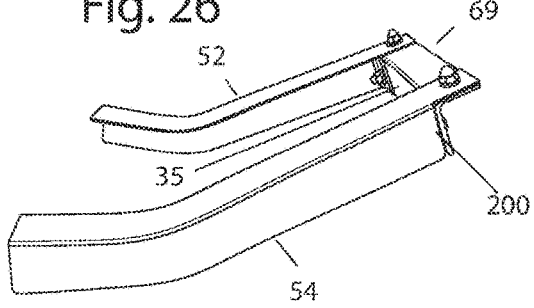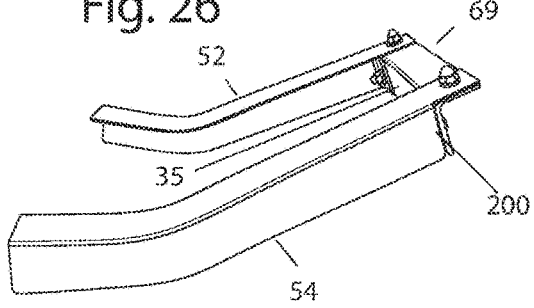

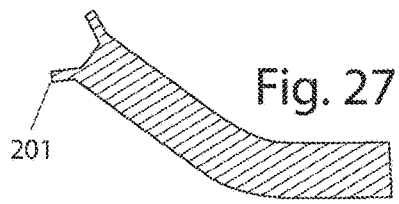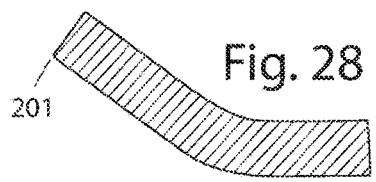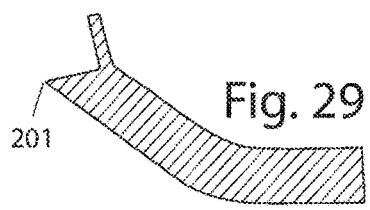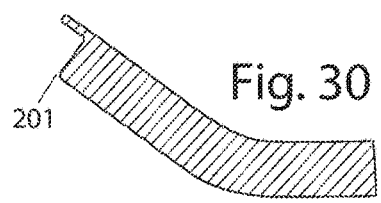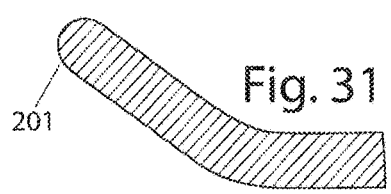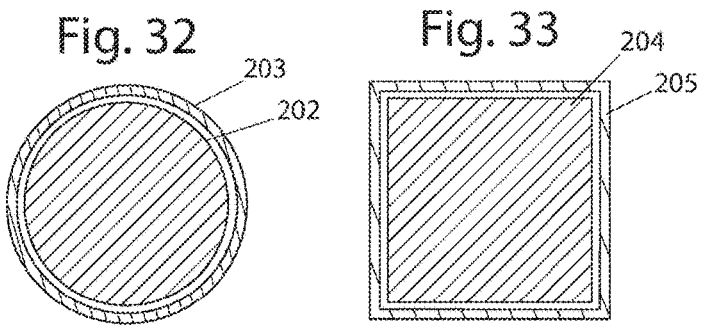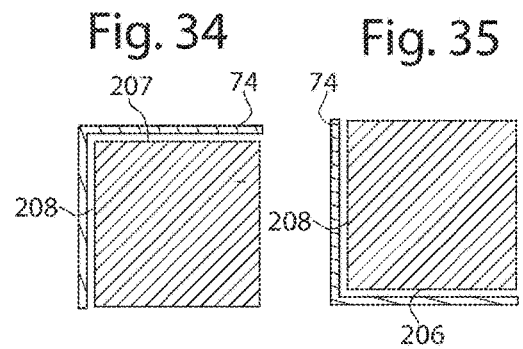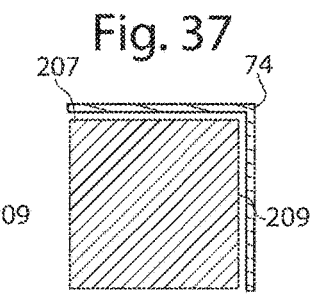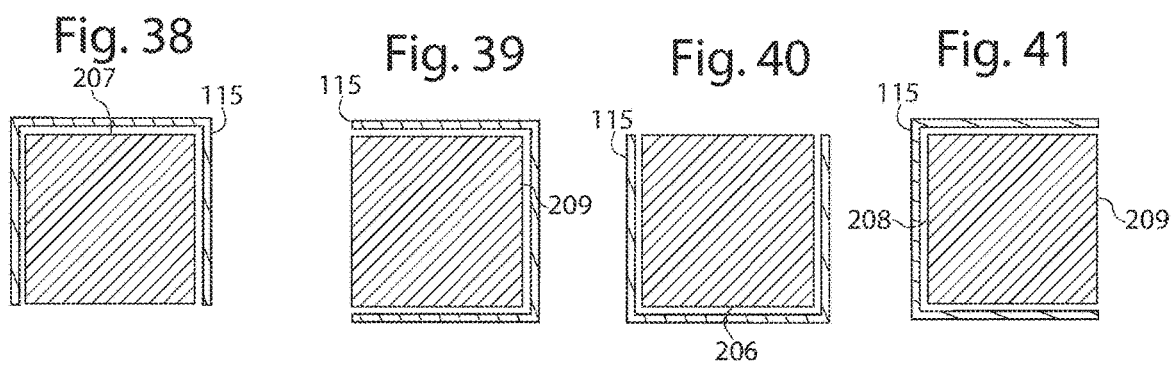

ELEVATED PIVOT BRACKET FOR A WHEELBARROW

RELATED APPLICATION DATA

This application is a continuation of U.S. patent application Ser. No. 17/444,975, filed on Aug. 12, 2021, and titled "Elevated Pivot Bracket for a Wheelbarrow," which application is a divisional of U.S. patent application Ser. No. 15/903,004, filed on Feb. 22, 2018, now U.S. Pat. No. 11,285,982, which application claims the benefit of priority of U.S. Provisional Patent Application Ser. No. 62/462,107, filed on Feb. 22, 2017, and titled "Elevated Pivot Bracket for Wheelbarrow use in Uneven Terrain." Each of these applications is incorporated by reference herein in its entirety.

FIELD OF THE INVENTION

The present disclosure relates to wheelbarrows and more particularly to an elevated pivot bracket for a wheelbarrow and connection struts therefor.

BACKGROUND

Wheelbarrows are one of the oldest inventions, and are used to manually move material in many different types of terrain. Wheelbarrows have a tray (platform, cargo-carrying bin, tub, hopper), a frame assembly comprising two handle portions, support legs, and a wheel. Wheelbarrow operators regularly experience poor ergonomic posture when navigating wheelbarrows in uneven terrain. Having a wheelbarrow design that improves the ergonomic operation of wheelbarrows in uneven terrain is needed.

SUMMARY OF THE DISCLOSURE

In one implementation, the present disclosure is directed to a connection strut for a wheelbarrow having two handles with corresponding forward end sections, at least one wheel rotatable around a rotational axis, a pivot bracket joining the two handle forward end sections in front of the at least one wheel and a cargo carrying tray, wherein: the pivot bracket includes spaced first and second support legs with a bight joined therewith, each of the first and second support legs having a forward end portion and a back end portion, wherein the back end portions of the first and second support legs are designed and configured to be attached to the forward end sections of the handles, and wherein at least a portion of the bight is located between the forward end portions of the first and second support legs; the bight is designed and configured to be located forward and above the rotational axis of the wheel when the pivot bracket is installed on the wheelbarrow and the wheelbarrow is resting on a flat level surface without being tilted forward; said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow; the cargo carrying tray is mounted above the handles; and the connection strut comprises an elongate member configured to be mounted between the pivot bracket and a forward surface of the cargo carrying tray to provide a connection between the pivot bracket and forward surface of said tray.

In another implementation, the present disclosure is directed to a kit for altering load carrying characteristics of a wheelbarrow having two handles with corresponding forward end sections, at least one wheel rotatable around a rotational axis, a pivot bracket joining the two handle forward end sections in front of the at least one wheel and a cargo carrying tray mounted above the handles. The kit includes a pivot bracket with spaced first and second support legs with a bight joined therewith, each of the first and second support legs having a forward end portion and a back end portion, wherein the back end portions of the first and second support legs are designed and configured to be attached to the forward end sections of the wheelbarrow handles, and wherein: at least a portion of the bight is located between the forward end portions of the first and second support legs; the bight is designed and configured to be located forward and above the rotational axis of the wheel when the pivot bracket is installed on the wheelbarrow and the wheelbarrow is resting on a flat level surface without being tilted forward; said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow; and connection struts comprising an elongate member configured to be mounted between the pivot bracket and a forward surface of the cargo carrying tray to provide a connection between the pivot bracket and forward surface of said tray.

In yet another implementation, the present disclosure is directed to a method of altering load carrying characteristics of a wheelbarrow having two handles with corresponding forward end sections, at least one wheel rotatable around a rotational axis, a pivot bracket joining the two handle forward end sections in front of the at least one wheel and a cargo carrying tray mounted above the handles. The method includes installing a pivot bracket on the wheelbarrow, the pivot bracket having spaced first and second support legs with a bight joined therewith, each of the first and second support legs having a forward end portion and a back end portion, wherein the back end portions of the first and second support legs are designed and configured to be attached to the forward end sections of the wheelbarrow handles, and wherein: at least a portion of the bight is located between the forward end portions of the first and second support legs; the bight is designed and configured to be located forward and above the rotational axis of the wheel when the pivot bracket is installed on the wheelbarrow and the wheelbarrow is resting on a flat level surface without being tilted forward; said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow; and installing a connection strut between a forward surface of the cargo carrying tray and the pivot bracket, wherein the connection strut comprises an elongate structural member configured to be mounted to the cargo carrying tray and to the pivot bracket to provide a connection therebetween.

DESCRIPTION OF DRAWINGS

For a better understanding of the invention, and to show how the same may be carried into effect, reference will now be made, by way of example, to the accompanying drawings, in which:

FIG. 9 shows a wheelbarrow with the second embodiment of a pivot bracket and it's connection struts;

FIG. 10 shows flat stock connection struts;

FIG. 11 shows connection struts fabricated out of metal tube;

FIG. 12 shows custom shaped connection struts;

FIG. 13 shows connection struts for side of pivot bracket installation fabricated out of flat material;

FIG. 14 shows orthogonal side view of a wheelbarrow identifying aspects of the range of coupling for the connection struts to the pivot bracket and the wheelbarrow tray;

FIG. 15 shows an overhead perspective view of the front of a wheelbarrow identifying aspects of the range of coupling for the connection struts to the pivot bracket and the wheelbarrow tray;

FIG. 16 shows a front perspective view of the front of a wheelbarrow identifying aspects of the range of coupling for the connection struts to the pivot bracket and the wheelbarrow tray;

FIG. 19 shows a side perspective of the third embodiment of a pivot bracket;

FIG. 20 shows a side perspective of the fourth embodiment of a pivot bracket;

FIG. 21 shows a side perspective of the fifth embodiment of a pivot bracket;

FIG. 22 shows a side perspective of the sixth embodiment of a pivot bracket;

FIG. 23 shows a side perspective of the seventh embodiment of a pivot bracket;

FIG. 24 shows a side perspective of the eighth embodiment of a pivot bracket;

FIG. 25 shows a side perspective of the ninth embodiment of a pivot bracket;

FIG. 26 shows a side perspective of the tenth embodiment of a pivot bracket;

FIG. 27 shows a cross-sectional view of the bight and support leg with a modified C shaped bight;

FIG. 28 shows a cross-sectional view of the bight and support leg with a straight bight;

FIG. 29 shows a cross-sectional view of the bight and support leg with a modified C shaped bight that has a tipped back orientation;

FIG. 30 shows a cross-sectional view of the bight and support leg with a modified L shaped bight like the first embodiment;

FIG. 31 shows a cross-sectional view of the bight and support leg with a radiused shaped bight.

FIG. 32 shows a round cross-sectional view of solid handles and a round cross-sectional view of a support leg;

FIG. 33 shows a rectangular cross-sectional view of solid handles and a rectangular cross-sectional view of a support leg;

FIG. 34 shows a rectangular cross-sectional view of solid handles and a first version of how an L cross-sectional shape may be oriented to the handles;

FIG. 35 shows a rectangular cross-sectional view of solid handles and a third version of how an L cross-sectional shape may be oriented to the handles;

FIG. 36 shows a rectangular cross-sectional view of solid handles and a third version of how an L cross-sectional shape may be oriented to the handles;

FIG. 37 shows a rectangular cross-sectional view of solid handles and a fourth version of how an L cross-sectional shape may be oriented to the handles;

FIG. 38 shows a rectangular cross-sectional view of solid handles and a first version of how a U cross-sectional shape may be oriented to the handles;

FIG. 39 shows a rectangular cross-sectional view of solid handles and a second version of how a U cross-sectional shape may be oriented to the handles;

FIG. 40 shows a rectangular cross-sectional view of solid handles and a third version of how a U cross-sectional shape may be oriented to the handles;

FIG. 41 shows a rectangular cross-sectional view of solid handles and a fourth version of how a U cross-sectional shape may be oriented to the handles.

DETAILED DESCRIPTION

Figure 1:
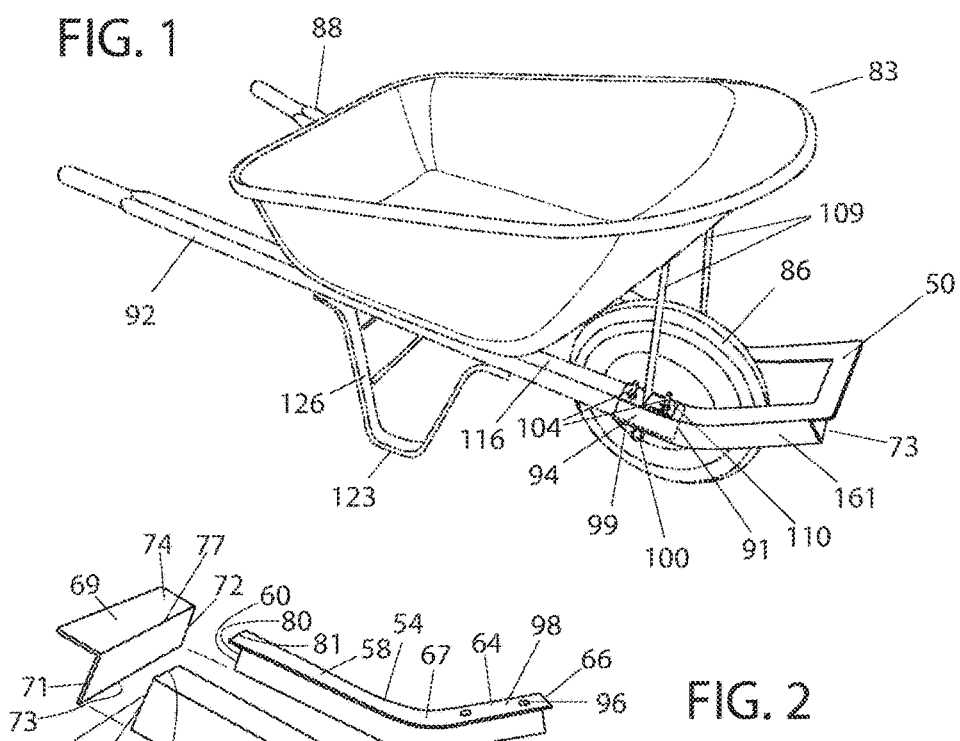
FIG. 1 shows a wheelbarrow with the first embodiment of the elevated pivot bracket for wheelbarrow installed.
Figure 2:
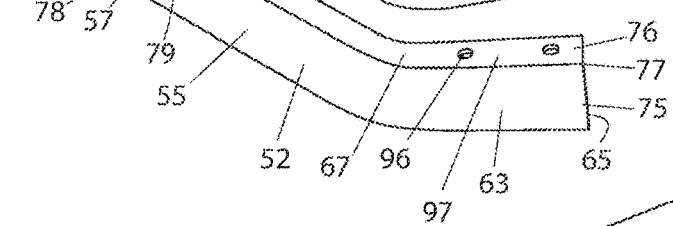
FIG. 2 shows an exploded view of first embodiment of pivot bracket.

FIG. 1 shows a first embodiment of an elevated pivot bracket 50 coupled to a wheelbarrow 83 via a first wheelbarrow handle 88 and a second wheelbarrow handle 92 and more specifically at a first handle/leg coupling section 95 (shown in FIG. 5) and a second handle/leg coupling section 94. (FIG. 2 shows the first embodiment of the elevated pivot bracket 50 formed as a L cross-sectional shape 74 and is preferably made of metal material, such as iron, steel, aluminum etc., although those of ordinary skill in the art will recognize that other suitable materials may be used, such as glass reinforced plastic, carbon fiber, or plastic. Other shapes are suitable such as, but not limited to, a U cross-sectional shaped member 115 (Shown in FIGS. 38, 39, 40, and 41). The pivot bracket 50 has a plurality of sections comprising a first support leg 52, a bight 69, and a second support leg 54. The L shape 74 (shown in FIGS. 2, 34, 35, 36, and 37) has a plurality of legs comprising a vertically oriented leg 75 and a horizontally oriented leg 76. The legs 75 and 76 are connected at a right angle 77.

The support legs 52 and 54 (shown in FIG. 2) each have a plurality of sections comprising a first leg/bight support section 55, and a first leg/handle coupling section 63, a second leg/bight support section 58, and a second leg/handle coupling section 64. The support legs 52 and 54 each have proximal and distal ends comprising a first leg/bight distal end 57, a first leg/handle proximal end 65, a second leg/bight distal end 60, and a second leg/handle proximal end 66. The leg/bight distal ends 57 and 60 have a plurality of forward edges comprising a first leg/bight vertically oriented distal edge 78, a first leg/bight distal horizontally oriented edge 79, and a second leg/bight distal vertically oriented edge 80 and a second leg/bight distal horizontally oriented edge 81.

The bight 69 has a plurality of ends comprising a bight first vertically oriented distal end 71 and a bight second vertically oriented distal end 72. The support legs 52 and 54 have an upwards incline transition section 67 at a predetermined angle, between 5 and 40 degrees, located forward of the leg/handle coupling section 63 and 64 which is between 6 cm and 20 cm in length. The longitudinal axis of the first leg/handle coupling section 63 of the first support leg 52 (shown in FIG. 2) is structured to align with the longitudinal axis of the first handle/leg coupling section 95 (shown in FIG. 5) of the first handle 88 (shown in FIG. 1). The longitudinal axis of the second leg/handle coupling section 64 of the second support leg 54 (shown in FIG. 2) is structured to align with the longitudinal axis of the second leg handle/leg coupling section 94 of the second handle 92 (shown in FIG. 1). A bight forward lower edge or surface 73 (shown in FIGS. 2 and 4) is generally positioned to be parallel to a centerline of rotational axis of wheel/tire 132 (shown in FIG. 5).

Figure 4:
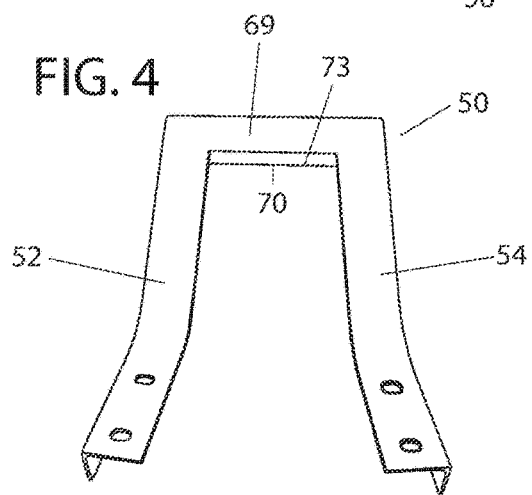
FIG. 4 shows overhead perspective of first embodiment of the pivot bracket.

The bight 69 is the middle section of the pivot bracket 50 (shown on FIG. 4). When coupling the first support leg 52, the bight 69, and the second support leg 54 (shown in FIG. 2) the first leg/bight distal vertically oriented edge 78 is positioned adjacent to and aligning with the bight first distal vertically oriented edge 71, the second leg/bight distal vertically oriented edge 80 is positioned adjacent to and aligned with the bight second distal vertically oriented end 72. The method of physically coupling the parts is described below.

A first leg/handle coupling horizontally oriented section 97 and a second leg/handle coupling horizontally oriented section 98 have a plurality of a holes 96 located at predetermined locations (shown in FIG. 2) to align with a first axle bracket coupling fasteners 102 (shown in FIG. 5) and a second axle bracket coupling fasteners 104 (shown in FIG. 1). The holes 96 (shown in FIG. 2) are for coupling the pivot bracket 50 to the wheelbarrow 83 (FIG. 1). An axle brackets 99 (shown in FIGS. 1 and 5) couple an axle 100 to the handles 88 and 92. The axle 100 rotatably couples a wheel/tire 86 (shown in FIG. 1) to the handles 88 and 89.

Figure 3:
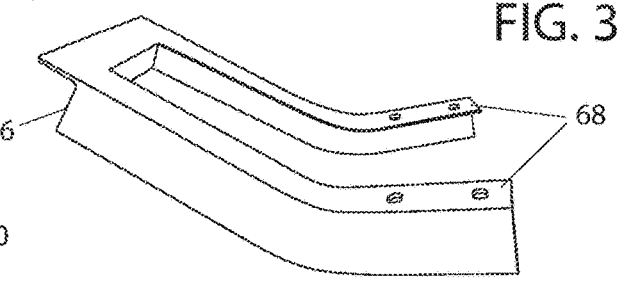
FIG. 3 shows side perspective of first embodiment of the pivot bracket.
Figure 6:
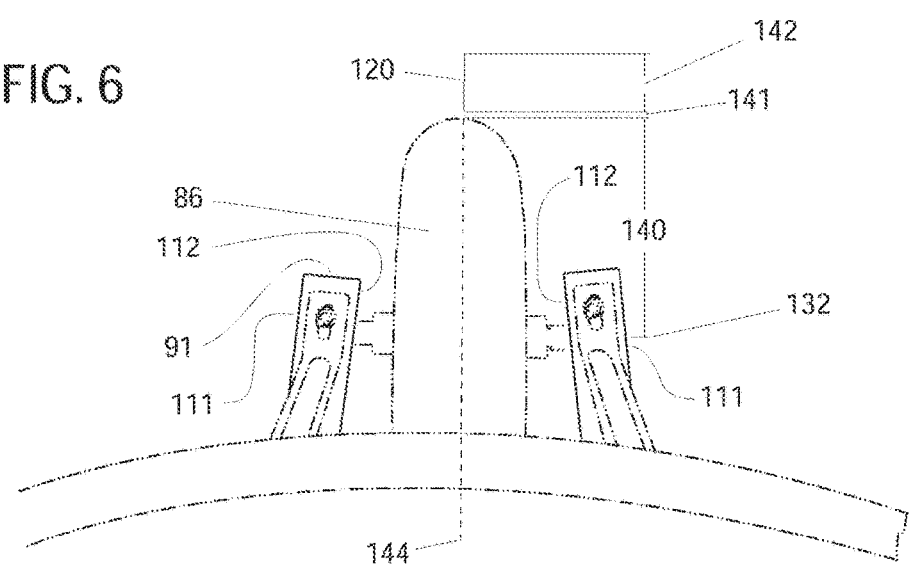
FIG. 6 shows an overhead perspective view of the front section of a wheelbarrow, with the pivot bracket removed, identifying the an overhead perspective of the location of the range of location relative to the tire and the centerline of the wheel and wheelbarrow.

The holes 96 (shown in FIG. 2) can range from a circular hole, to a square hole to an ovalized hole (rectangular with radiused ends) to rectangular holes. Diameter dimensions for a round hole range from 0.6 cm to 1.9 cm. Single side dimension for square holes can range from 0.6 cm to 1.9 cm. For ovalized and rectangular holes the width can range from 0.6 cm to 1.9 cm and the length can range from 0.6 cm to 3.8 cm. The orientation of holes relative to the positioning on a top surface of the leg/handle coupling section 68 can have a front to back as well as a side-to-side orientation +/−30 degrees (shown in FIG. 3). FIGS. 2A and 2B illustrate a single slat protective and exercise restraint system 200. Portions of system 200 that can be implemented using parts similar or identical to those of system 100 use the same reference numerals as are used in connection with FIGS. 1A and 1B and will not be further described in descriptions of subsequent embodiments, as the subsequent description of FIGS. 2A and 2B and other embodiments will focus on aspects of system 200 that differ from system 100. As shown in FIGS. 2A and 2B, single slat protective and exercise restraint system 200 may include many of the same components as system 100, but may be implemented in a single slat and/or dorsal arm rest fashion. As best seen in FIG. 2B, bicep strap 124 may be connected to a tricep cradle 204 at tricep cradle connecting regions 208 using appropriate attachment means, such as an adhesive and/or hook and loop fasteners. A tricep cradle extension 212 may be connected to tricep cradle 204 through a telescoping mechanism 216 that can be locked by aligning a spring-loaded ball-bearing 112 disposed in the tricep cradle extension with one of two or more holes 220 disposed in the tricep cradle or by using any other appropriate mechanism. Similarly, a hand guard 224 may be connected to tricep cradle extension 212 through a telescoping mechanism 228 that can be locked by aligning a spring-loaded ball-bearing 112 disposed in the hand guard with one of two or more holes 232 disposed in the tricep cradle extension or by using any other appropriate mechanism. An alternative single slat and/or dorsal arm rest protective and exercise restraint system 600 having a slightly different arrangement from system 200 is shown in FIG. 6. As shown, system 600 may include an axilla extension 604 and a telescoping mechanism 608 like those described above that enables the axilla extension to be adjusted relative to tricep cradle 212. In such an implementation, bicep strap 124 may be connected to and/or fed through slots on axilla extension 604. Although not shown in FIG. 6, an inflexible tie like inflexible tie 176 and an attachment point like attachment point 180 may be used with system 600. Generally, any of the systems disclosed herein may be outfitted with inflexible tie 176 and/or resistance band 168, as desired.

Range of Location

The bight 69 is the middle section of the pivot bracket 50 (shown in FIG. 2). It spans between the first support leg 52 and the second support leg 54. The bight lower forward edge or surface 73 is located within a range of location rectangle 120 (shown in FIG. 5). More specifically a center of bight forward edge or surface 70 (shown in FIG. 4) is located at the center of bight 69 within +/−20% of length of width of the bight 69, or the bight lower forward edge or surface 73 (shown in FIG. 4). A description of the location of range rectangle 120 is described below.

Figure 5:
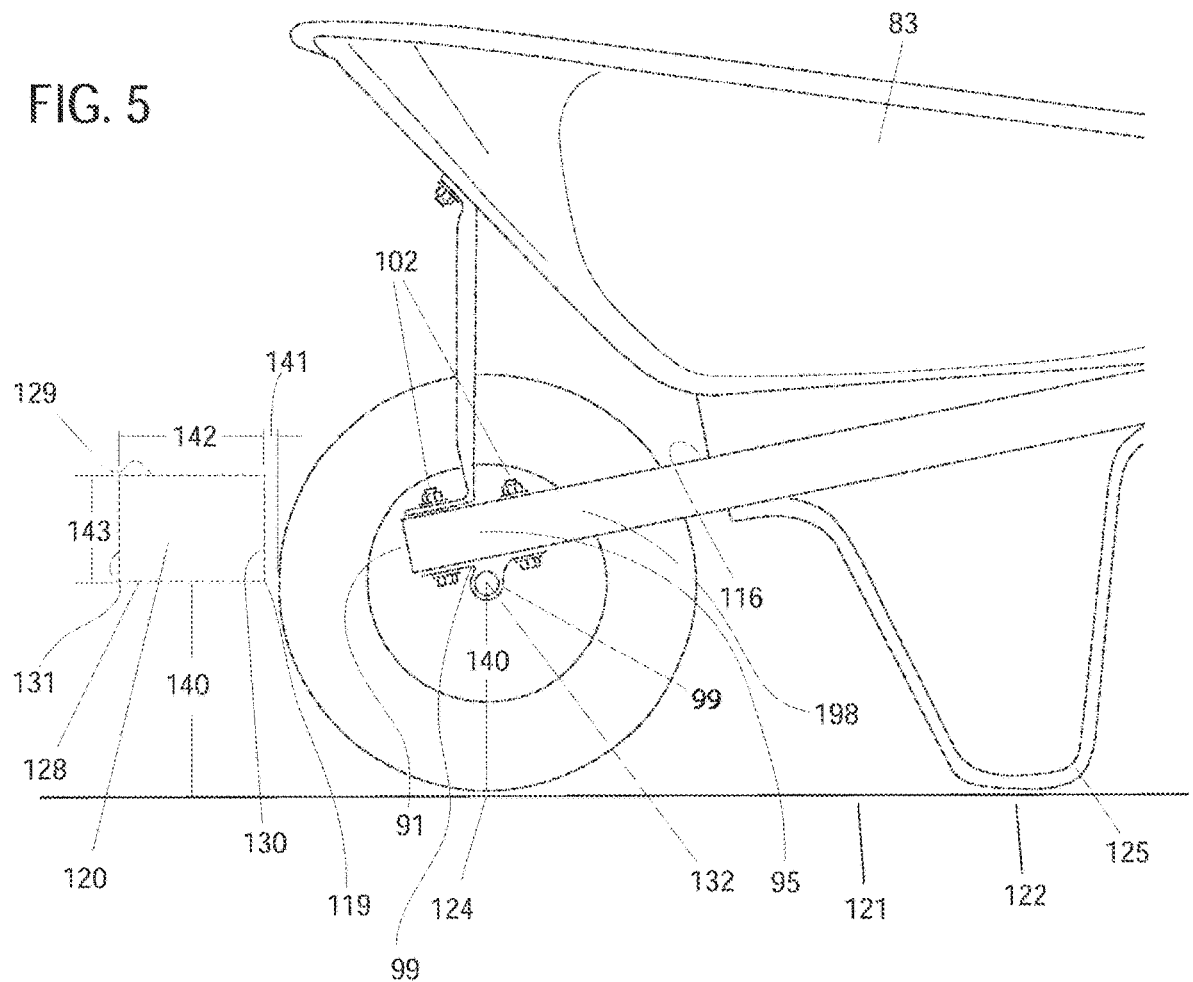
FIG. 5 shows orthogonal view of a wheelbarrow, with the pivot bracket removed and situated on a flat level surface, identifying the range of location for the pivot bracket lower forward edge as well as two of the three wheelbarrow contact points to the flat level surface.

FIG. 5 shows an orthogonal view of the wheelbarrow 83 with the pivot bracket 50 removed to identify the range rectangle 120 for the location of the bight lower forward edge or surface 70 (shown in FIG. 4). The range rectangle 120 is not an actual part of the pivot bracket 50. The range 120 is a two-dimensional rectangle and is used to define the range of location of an important part of the pivot bracket 50, the bight lower forward edge or surface 70, relative to the wheelbarrow it is mounted on (seen in FIG. 4). In FIG. 5 the range 120 is located in the following described location when the wheelbarrow 83 is located on a flat level surface 121. The wheelbarrow 83 has a plurality of contact points with the flat level surface 121 comprising a first wheelbarrow support leg/flat level surface contact point 122, a second wheelbarrow support leg/flat level surface contact point 123 (shown in FIG. 1) and a wheel/tire/flat level surface contact point 124. Shown in FIG. 6 the range 120 is parallel to a forward and back centerline plane 144 of wheelbarrow 83 and is perpendicular to a rotational axis centerline 132.

Shown in FIG. 5, the four sides of the range 120 comprising a lower range of location boundary 128, a back range of location boundary 130, an upper range of location boundary 129, and a forward range of location boundary 131. The upper boundary 129 and lower boundary 128 are both parallel to the flat level surface 121. The forward boundary 131 and the back boundary 130 are parallel to each other and perpendicular to the flat level surface 121. The intersection of the lower boundary 128 and back boundary 130 is a reference location 119. A radius dimension 140 of properly inflated tire is the distance the reference location 119 is located above flat level surface 121. The reference location 119 is located forward of rotational axis 132 by the distance of the radius 140 plus 1.3 cm. The forward boundary 131 is forward of the back boundary 130 by 14 cm+/−10% distance. The upper boundary 129 is above the lower boundary 128 by 11 cm+/−10% distance.

The forward range boundary 131 is perpendicular to the centerline 144 and is perpendicular to the flat level surface 121.

Fabrication of the pivot bracket 50 (shown in FIG. 1) may be accomplished by those having ordinary skills in the arts. Three pieces of metal of a predetermined size and thickness should be cut out of a larger piece of steel using a metal cutting device, such as a metal sheer, to create the support legs 52 and 54 and the bight 69 (shown in FIG. 2). Material thickness ranges from 0.15 cm to 0.95 cm for all three pieces. Material dimension range for the bight 69 is 3.8 cm to 16 cm for the width and 20 cm to 30 cm for the length. The range for each of the support legs 52 and 54 is 3.8 cm to 16 cm for the width and 25 cm to 46 cm for the length (shown in FIG. 2). The pieces should be formed or bent to the L shape 74 to predetermined specifications. Angle range is between 80 to 100 degrees and formed along the centerline of the long dimension by a tool such as a metal brake. The support legs 52 and 54 should then have the holes 96 holes created in the predetermined location, which are defined above, in the leg/handle coupling section 97 and 98 (shown in FIG. 2). The support legs should have the net upwards incline 67 (shown in FIG. 2) formed in them to the predetermined specified angle range between 5 degrees and 45 degrees with a tool such as a Hossfeld Bender.

All surfaces of the three pieces should have all surfaces properly prepared to predetermined specification such as deburring edges with a tool such as a sander. The support legs 52 and 54 and the bight 69 should be properly positioned and secured for coupling (shown in FIG. 2) with tools such as clamps and jigs. The joints between the support legs 52 and 54 and the bight 69 should be welded (shown in FIG. 2) with a tool such as a welder. All surfaces should be should be properly prepared for applying desired finish. Range for finish preparation spans doing nothing for a raw untouched finish to grinding/sanding welds and surfaces smooth to make them invisible and polishing entire surface to an ultra-smooth flawless surface for a finish of a clear coat or chroming with a tool such as a sander. Once prepared, a finish such as paint may be applied with a can of spray paint.

Installation

Figure 8:
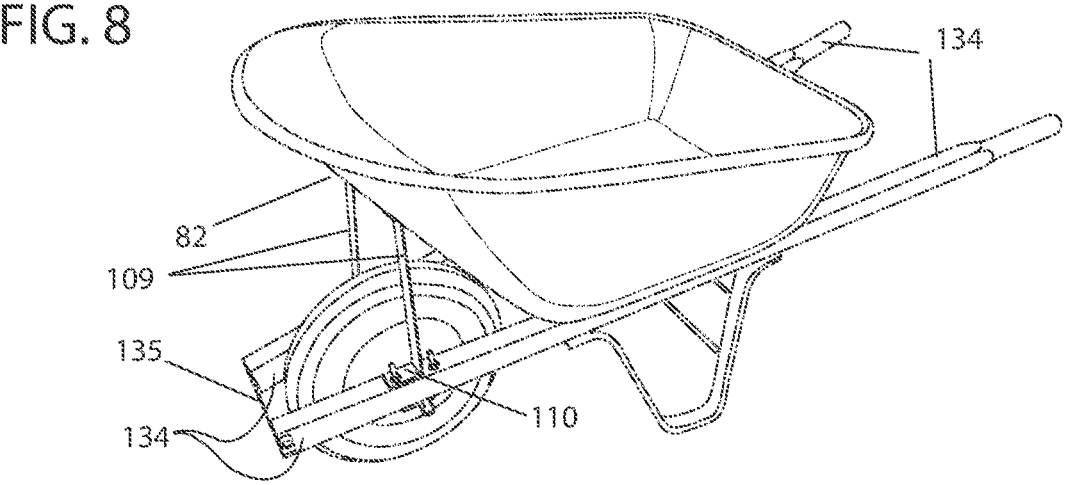
FIG. 8 shows a standard wheelbarrow with its handles, tray, and wheel.

Those having ordinary skills in the arts should be able to install the pivot bracket 50 onto the wheelbarrow 83 (shown in FIG. 1). An appropriated place to start the installation of the pivot bracket is ensuring the handles 88 and 92 are the proper length (shown in FIG. 1). In new construction the handles would be specified to have a predetermined length whose forward end is a forward end of a handle/leg coupling section 91 (shown in FIG. 1, 5). The forward end 91 is located between 2.5 cm to 10 cm+/−20% of 10 cm, forward of a plane that runs through the rotational axis 132 (shown in FIGS. 5 and 6) and is perpendicular to the front and back direction of a top surface of the handle 116 (shown in FIGS. 1 and 5). When retrofitting an existing standard wheelbarrow 82 (shown in FIG. 8) the handles 88 and 92 (shown in FIG. 1) should be adjusted, if needed, to have the forward end 91 (shown in FIGS. 1 and 5) in the correct place as identified above, with a tool such as a saw, to cut the handle to the correct length.

When assembling a new wheelbarrow with the pivot bracket 50 the installation of the actual pivot bracket may be done near the end of the process. All parts, with the exception of the pivot bracket 50 (shown in FIG. 1) would be assembled with fasteners in place, but not tightened, according to the manufacturer's assembly manual. The axle bracket fasteners 102 and 104 would be removed (shown in FIGS. 1 and 5). The leg/handle coupling section 63 and 64 (shown in FIG. 2) would be positioned on the handle/leg coupling section 95 (shown in FIG. 5) and 94 of the handles 88 and 92 (shown in FIG. 1). The handle/leg coupling section 95 and 94 extends forward 10 cm+/−10% and behind 10 cm+/10% a plane that runs through the rotational axis 132 (shown in FIG. 6) and is perpendicular to the front and back direction of the top surface of handle 116 (shown in FIG. 1). If the wheelbarrow 83 has a tray support 109 specified in bill of material, then during assembly a lower tray support flange 110 (shown in FIG. 8) may be positioned on the top surface of the leg/handle coupling section 68 (shown in FIG. 3). Once the pivot bracket 50 is properly positioned, the axle bracket coupling fasteners 102 and 104 should be replaced and the fasteners 102 and 104 should be tightened to manufacturer's specifications. All other fasteners for the wheelbarrow would be tightened to manufacturer's specification (shown in FIGS. 1 and 5).

When retrofitting an existing wheelbarrow the axle bracket fasteners 102 and 104 would be removed (FIGS. 1 and 5). The leg/handle coupling section 63 and 64 (FIG. 2) would be positioned on the handle/leg coupling section 95 (FIG. 5), 94 of the handles 88 and 92 (FIG. 1). The handle/leg coupling section 90 and 94 extends forward 10 cm+/−10% and behind 10 cm+/−10% a plane that runs through the rotational axis 132 (shown in FIG. 5) and is perpendicular to the front and back direction of the top surface of handle 116 (shown in FIG. 1). If the wheelbarrow 83 has the tray supports 109 then during assembly the lower tray support flange 110 may be positioned on the top surface of the leg/handle coupling section 68 (shown in FIG. 3). Once the pivot bracket 50 (shown in FIG. 1) is properly positioned the axle bracket coupling fasteners 102 and 104 should be replaced and the fasteners 102 and 104 should be tightened to manufacturer's specifications (shown in FIGS. 1 and 5).

Operation

Figure 7:
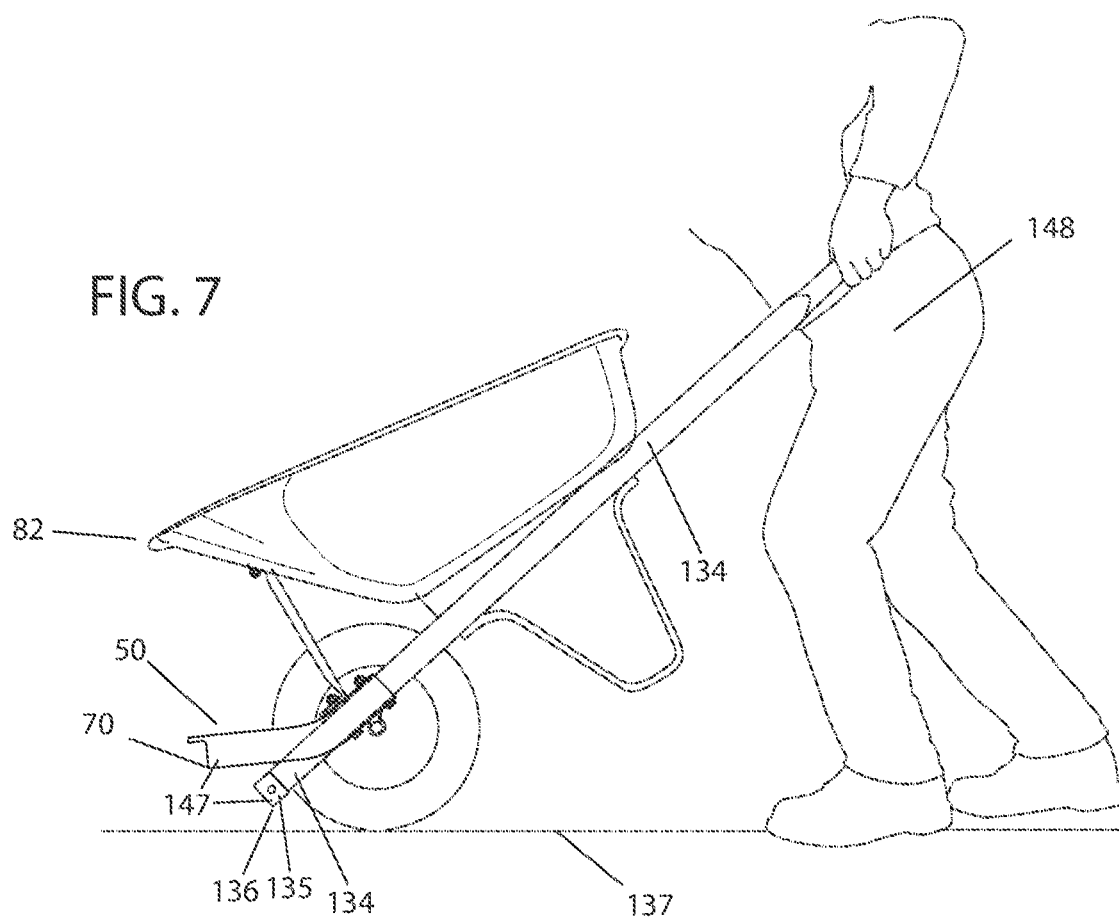
FIG. 7 shows orthogonal view of a wheelbarrow with an elevated pivot bracket installed as well as with standard wheelbarrow full-length handles and wheel guard. This perspective shows the wheelbarrow in a tipped operational mode with an operator, to show the elevation differences between the bottom forward edge of the pivot bracket versus the bottom edge of a standard wheelbarrow's lower edge of its wheel guard, relative to surface the wheelbarrow is being operated.

Shown in FIG. 7 wheelbarrows with the pivot bracket 50 installed are operated normally on a surface being operated on 137 if they are flat and level. However in uneven terrain the elevated height of the lower edge of the bight 69 may reduce the chances of a structure forward of the wheel from coming in contact with objects on or protruding up from the ground. If the forward structure 147 comes in contact with the surface 137 while operator is pushing the wheelbarrow in a forward direction, the wheelbarrow may stop and inadvertently empty. FIG. 7 shows the existing standard wheelbarrow 82 with a pivot bracket 50 installed, however the stock length handles 134 remain their original length and a wheel bumper 135 is installed (shown in FIGS. 7 and 8) for the purposes of contrasting the differences between the standard wheelbarrow 82 (shown in FIG. 8), and one with the pivot bracket 50 installed (shown in FIG. 7).

FIG. 7 shows the position of the wheelbarrow 82 in operational mode being pushed by a 183 cm tall operator 148. A lower edge of the wheel bumper 136 is very close to a surface 137 being operated on. The distance between a bumper lower edge 136 and the surface 137 will vary depending numerous variables comprising the height of the operator and weight of the load in the wheelbarrow 82, whether the operator is going up or down an incline. As shown in FIG. 7, the distance is between the lower edge of the wheel bumper and the surface 137 is approximately 4 cm. whereas the distance between the bight forward edge 70, of the pivot bracket 50, is approximately 11 cm over the surface 137. When operating the wheelbarrow 83 with standard length handles 134 and the wheel bumper 135, (shown in FIG. 7), the lower bumper edge 136 may come in contact with objects on the ground greater than 4 cm. in height whereas with the pivot bracket 50 installed, as described above, the objects would need to be 11 cm in height for contact to occur. An operator 148 may have to lower the handles, by bending over or walking at a lowered position, incurring poor posture, to keep the wheelbarrow 82 with stock length handles 134 and the wheel bumper 135 from striking the ground in uneven terrain, or going from a level surface up an inclined surface, or down an inclined to a level surface. Whereas the operator 148, in the same scenario, with the pivot bracket 50 properly installed, as described above, should be able to navigate the same terrain with a reduced chance of having the forward structure 147 come in contact with the ground. Therefore reducing the chances of inadvertently dumping the wheelbarrow load as a result of the structure 147 forward of the wheels coming in contact with the ground and having an increased chance of operating the wheelbarrow with improved posture.

FIG. 9 shows a second embodiment of the pivot bracket 50. Wheelbarrows designed and built for transporting heavy loads, such as concrete, may require additional connection between the pivot bracket 50 and a forward surface of the wheelbarrow tray 153. A pair of connection struts 150 provides the connection. A wheelbarrow tray 152 is the part of the wheelbarrow where the material the wheelbarrow is carrying is contained. Manufacturers may specify a plurality of the struts 150. The connection struts 150 provide connection between the forward section of the pivot bracket 50 and the forward surface of the wheelbarrow tray 153. The struts 150 attach to the forward area of the pivot bracket 50, covered below, and to the forward surface of the wheelbarrow tray 153 covered below. Each of the struts 150 have an attachment flange 151 on either end. The flanges 151 have a flange hole 156. The struts 150 may be fabricated out of flat metal, although those of ordinary skill in the art will recognize that other suitable shapes may be used such as square, round, or other readily available shapes as well as custom shapes. The shapes may be solid or hollow. The strut 150 may be constructed out of other materials, although those of ordinary skill in the art will recognize that other suitable materials such as, but not limited to, aluminum, glass reinforced plastic, or carbon fiber may be used.

FIG. 10 shows the strut 150 fabricated out of flat metal material. The flange holes 156 can range from a circular hole, to a square hole, to an ovalized hole (rectangular with radiused ends) to rectangular holes. Diameter dimensions for a round hole range from 0.6 cm to 1.9 cm. Single-side dimension for square holes can range from 0.6 cm to 1.9 cm. For ovalized and rectangular holes the width can range from 0.6 cm to 1.9 cm and the length can range from 0.6 cm to 3.8 cm. The ovalized or rectangular holes are generally oriented longitudinally relative to the struts 150. However, they may have a side-to-side orientation. The orientation may vary +/−30 degrees off of the centerline axis or the side-to-side axis. The flanges 151, prior to having a bend 154 formed in them are generally flat and align with the plane of a main body of the strut 155 +/−10 deg. The flange 151 range in length from 1.9 cm to 6.3 cm in length +/−10%. The bend 154 is approximately perpendicular to the longitudinal axis of the main body +/−15 degrees. The bend 154 angle ranges from 60 deg. to 120 deg. The struts 150 from the bend 154 to the bend 154 range in length from 22 cm to 56 cm. The struts 150 fabricated out of flat metal material range in thickness from 0.12 cm to 1.0 cm. and are fabricated with the bend 154 relative to the longitudinal axis of the strut 150.

Construction

Those having ordinary skills in the arts may accomplish building the struts 150 from flat material. Manufacturers of flat metal material manufacture many different standard thicknesses and widths of material and of different types of metal depending on the requirements of the application. One stock size readily available is 0.635 cm thick by 2.54 cm wide. To build a strut 150 from said material that is 45 cm long from the bend 154 to the bend 154 with 3.8 cm flanges on either end, one would cut a piece of the material 52.6 cm long with a tool such as a metal shear. Creating the flange holes 156 may be created with a drill press. The flange holes 156 for this example may be 0.794 cm in diameter. To form the flanges one should mark the material 3.8 cm in from each end for this example. A metal bending break is a tool that will form the angles in the material at the marked location on both ends to 90 degrees for this example.

Installing struts may be identified in the manufacturer's assembly instructions. Generally struts are coupled to existing holes (not illustrated) in the wheelbarrow tray 153 and the pivot bracket 50 that were specified in the wheelbarrow manufacturer's product specifications. Generally, struts are fastened to the wheelbarrow tray 153 and the pivot bracket 50 by manufacturer specified nuts and bolts, other fasteners such as, but not limited to, rivets or screws may be used. Additionally, permanent bonding to either the pivot bracket 50 or wheelbarrow tray 153 may be carried out by a method, such as but not limited to, welding.

FIG. 11 shows the strut 150 fabricated out a tubular metal 157. Construction is very similar to fabrication of above described flat metal stock with the exception of the flanges 151. To fabricate the flanges 151 one would mark the appropriate length on the tubular material for the flanges and then may use a hydraulic press to flatten the flange 151 sections. Holes are created in a like manner as described above. Forming the bends may be done with a tool such as a vice in conjunction with the operator's arm.

FIG. 12 shows the strut 150 formed out of metal and with a custom shape 158. This strut 150 with a custom "C" cross-sectional shape in the strut main body 155 is an example of a strut 150 that would be designed and specified for high volume production. Very expensive and intricate dies would be designed and fabricated. An automated hydraulic press in a production line that has a capacity of 500-tons may be used in conjunction with other machinery to carry out the different steps in the process. Fabricating this product may be done in single or multiple steps. Raw material of a specified thickness and width will be fed into one side of the production line and a final product ready for deburring and painting will come out the other side of the production line. Example specifications for a custom shape may include: material thickness 0.27 cm, width 3.2 cm, overall length 38 cm, the flange 151 length 4 cm, oval flange hole 156 width 1.1 cm, oval flange hole 156 length 2.7 cm, oval flange hole 156 to end of flange 1.27 cm, height of C cross-sectional shape 0.8 cm. Installation is generally the same as described above for a flat stock strut 159.

FIG. 13 shows a flat material side mount connection strut 162 fabricated from flat metal, however for this application there are generally two of the struts 162 installed, one on each side of the pivot bracket 50. The flat material side mount connection strut 162 (shown in FIG. 13) is fabricated generally the same as the flat strut 159 with the exception that one of the flanges is not bent. For fabrication and installation methods reference methods described for FIG. 10.

Connection Strut Coupling Location Range

FIGS. 14, 15, and 16 show three different views of the front area of the wheelbarrow from different perspectives angles. The three views are used to identify the range of coupling between the connection struts 150 and the pivot bracket 50 as well as the connection struts 150 and a front face of the wheelbarrow tray 173. A single or plurality of struts 150 may be used to couple the pivot bracket 50 to the front face of the tray 173. Shown in FIG. 16 is a front partial perspective view of the front of a wheelbarrow 170 showing a strut tray connection range 171 for illustrating the range of connection for the struts 150 to the front face of the tray is. The range of connection where the struts 150 connect to the pivot bracket 50, include a plurality of sections comprising a first leg connection range 186, a bight center coupling range 187, and a second leg coupling range 188 shown in FIG. 15. On the front face of the wheelbarrow tray 173 the side boundaries, for the strut tray coupling range 171, are located on either side of and parallel to, a tray centerline 172 (shown in FIG. 16). A distance from centerline 172 to a first vertical tray strut boundary 174 is 25% of a total width of the wheelbarrow 170 when measured at the widest point of wheelbarrow tray rim 177.

A second vertical tray boundary 175 is spaced from the centerline 172 by the same distance as boundary 174 is spaced from centerline 172. The upper boundary of the tray strut connection range and the underside of a tray rim boundary 178 is the intersection between the tray face 173 and the wheelbarrow tray rim 177 between the vertical tray boundary 174 and the vertical tray boundary 175. The lower boundary is a bottom strut tray boundary 179. It is perpendicular to the tray centerline 172 and is located 50% of the distance between the tray rim boundary 178 and the front of a tray surface centerline/bottom of the tray centerline intersection 181. Shown in FIG. 14 a bottom of the tray surface centerline 184 is located in the center of and on the outside bottom surface of the wheelbarrow tray and parallel with the general surface of the bottom of the wheelbarrow tray 170 and the front and back oriented centerline of the wheelbarrow 170. The front of a tray surface centerline 183 is parallel to the tray centerline 172 and is on an outside tray front surface 195, and runs from the tray rim 177 down to front of the tray surface centerline/bottom of the tray centerline intersection 181. The connection strut or struts 150 can be connected to the tray anywhere within the strut tray connection range 171.

Shown in FIG. 15 is an overhead partial perspective view of the front of the wheelbarrow 170 and the pivot bracket 50. The connection strut pivot bracket connection range is divided into a plurality sections, the first leg connection range 186, the bight center connection range 187, and the second leg connection range 188. A first and second leg connection range distance 165 for the first and second leg connection range 186 and 188 is located forward of 50% of the distance between the rotational axis 132 and a forward edge of the bight 167. A bight connection range distance 169 spans from a first outside edge of the bight 191 to a second outside edge of the bight 192. The connection struts can be connected to the bight 69 anywhere within the bight connection range 187 and on a top surface of a pivot bracket 193 within the bight connection range 187. The connection struts 150 may be attached anywhere within the first and second leg connection ranges 186 and 188 on the top surface of the pivot bracket 193 within the ranges 186 and 188.

Shown in FIG. 14 the connection struts may be attached to the pivot bracket 50 on a first side surface of a leg/bight support section 160 within the first leg connection range 186 or a second side surface of the leg/bight support section 161 (shown in FIG. 1) within the second leg connection range 188 (shown in FIG. 15).

FIG. 19 shows a third embodiment of the elevated pivot bracket 50 which is fabricated out of three pieces of flat stock and is preferably made of metal material such as steel although those of ordinary skill in the art will recognize that other suitable materials, such as aluminum, may be used. The finished dimension lengths, widths, hole size and spacing, and upward inclination angles as well as attachment of the leg/handle coupling sections 63 and 64 to the handle/leg coupling sections 94 (shown in FIG. 1), 95 (shown in FIG. 5) are very similar the first embodiment. It is constructed and the specifications for material are different. To construct an example of the third, one would start with flat stock steel that is 2.5 cm wide by 0.476 cm thick and cut into three pieces. One 22 cm piece and two pieces 75 cm long for the first and second support legs 52, and 53 may be used for the bight 69. The holes 96 would first be drilled with a tool such as a drill press; one of the holes 96 in the middle both length wise and side-to-side for attaching the bight 69 to the support legs 52 and 53. Holes to attach the support legs to the handles 88 and 92 are as described for the first embodiment for positioning, with the difference that there are the holes 96 required in both an upper portion 196 and a lower portion 197 of the support legs 52 and 53. A tool such as a Hossfeld bender may be used to put the bends in the support legs 52 and 53. Two 90-deg bends are put in 1.3 cm on either side of the hole in the center on each of the support legs 52 and 53. The remaining bends to create the upward incline are approximately within +/−2.5 cm, as described for the first embodiment. Installing the pivot bracket 50 is very similar to the first embodiment with the exception that the bight 69 requires a plurality of fasteners to connect the bight to the support legs 52 and 53. The method of fastening the pivot bracket to the handles 88 and 92 is very similar to the first embodiment.

FIG. 20 shows a fourth embodiment of the elevated pivot bracket for the wheelbarrow which is fabricated out of a single piece of metal material such as, but not limited to, steel and formed into the pivot bracket. It is very similar to the first embodiment with the exception of how it is made. Very expensive and intricate dies would be designed and fabricated. An automated hydraulic press in a production line that has a capacity of 500-tons or more may be used in conjunction with other machinery to carry out the different steps in the process. Fabricating this product may be done in a single or a plurality of steps. Raw material of a specified thickness and width will be fed into one side of the production line and a final product ready for deburring and painting will come out the other side of the production line. The material specifications may be very similar to the first embodiment with the difference being that instead of three individual pieces, one long single piece would be specified. The length range is 70 cm to 126 cm. Installation and operation are the same as the first embodiment.

FIG. 21 shows a fifth embodiment of the elevated pivot bracket 50, which is fabricated out of a single piece of material and formed into the pivot bracket 50. It is very similar to the fourth embodiment with the exception that the bight 69 section of the pivot bracket 50 is a radius connecting the first and second support legs 52 and 54 instead of being straight. A tool such as a Hossfeld bender may be used to form this embodiment. Specifications used in the fourth embodiment are very similar within +/−20%.

FIG. 22 shows a sixth embodiment of the elevated pivot bracket 50, which is fabricated out of a single piece of material and formed into the pivot bracket. It is very similar to the fifth embodiment in that the bight 69 section of the pivot bracket 50 is a radius connecting the first and second support legs 52, 54 instead of being fabricated in straight sections, however it is made out of round material and it is coupled to the side of the handles 88 and 92 (shown in FIG. 1) at the first and second handle/leg coupling section 94 (shown in FIG. 1), 95 (Shown in FIG. 5). Further, the plurality of fasteners coupling leg/handle coupling sections of the pivot bracket 50 to the leg/handle coupling sections 95 (shown in FIG. 1) and 94 shown in (FIG. 5) are aligned horizontally. The material may be round (shown in FIG. 22) although those of ordinary skill in the art will recognize that other suitable materials may be used such as square, oval, rectangle etc. The round material is preferably made of metal material such as iron, steel, aluminum etc., although those of ordinary skill in the art will recognize that other suitable materials may be used, such as glass reinforced plastic, carbon fiber, or plastic. The round material may be solid, however it may be hollow as well. The outside diameter of the round material may range from 1.3 cm to 5 cm. If the material is hollow the wall thickness may range from 0.25 cm to 0.65 cm. The length of the material may range from 60 cm to 120 cm. A plurality of holes may be created in each of the leg/handle coupling sections 97, 98. The holes 96 can range from a circular hole, to a square hole, to an ovalized hole (rectangular with radiused ends) to rectangular holes. Diameter dimensions for a round hole range from 0.6 cm to 1.9 cm. Single side dimension for square holes can range from 0.6 cm to 1.9 cm. For ovalized and rectangular holes the width can range from 0.6 cm to 1.9 cm and the length can range from 0.6 cm to 3.8 cm. The orientation of holes on the flattened surface may have a front to back as well as a side-to-side orientation +/30 degrees.

Fabricating an example of the sixth embodiment made out of tubular material 10.9 cm in outside diameter with a wall thickness of 0.125 cm and is 100 cm in length is described below. A section of tube is cut to 100 cm in length with a tool such as a hacksaw. A mark should be made at 13 cm in from each end to define the range the leg/handle coupling sections 97, 98 will be flattened by a tool such as a hydraulic press. Two holes will be put in each of the flattened leg/handle coupling sections 97, 98. For this example, the holes 96 measuring 0.95 cm in dia. will be drilled in 2 cm and 10 cm in from the end and along the centerline of the flattened sections. A tool such as a Hossfeld Bender may be used to put the bend in the tube material between the flattened leg/handle coupling sections 97, 98. A 170-degree arc will be put in the middle of the material in a manner that when completed, the flattened leg/handle coupling sections 94, 95 will have parallel vertical surfaces. A 25-degree upward angle will be formed into in the tube section starting 3 cm after each of the flattened leg/handle coupling sections 97 and 98. The flattened leg/handle coupling sections 97 and 98 will have a small inward bend formed in them with a tool such as a vise to make them conform with the first and second handle/leg coupling sections 94 (shown in FIG. 1), 95 (shown in FIG. 5). As used herein, the word "conform" means that two or more elements are structured to have one element disposed snugly within the other element. Thus while both elements have a similar or complementary cross-sectional shape, the inner element is slightly smaller than the outer element.

Installation

The holes 96 measuring 0.95 cm in diameter will need to be drilled horizontally through handles aligned with the longitudinal centerline of the outside face of the in the handles 88, 92 (shown in FIG. 1) first and second handle/leg coupling sections 94 (shown in FIG. 1) and 95 (shown in FIG. 5). The holes will be drilled, with a tool such as a drill, 8 cm apart and in the first and second handle/leg coupling sections 94 (shown in FIG. 1) and 95 (shown in FIG. 5) in a way that each of the holes are at least 1 cm away from the axle bracket coupling fastener 102 (shown in FIG. 5) and 104 (shown in FIG. 1). Fasteners such as bolts and nuts of a diameter of 0.9 cm in dia. and a length between 15 cm and 80 cm may be used in conjunction to securely couple the sixth embodiment of the pivot bracket 50 to the wheelbarrow 83 (shown in FIG. 1).

FIG. 23 shows a seventh embodiment of the pivot bracket 50 made out of flat material. It is very similar to the sixth embodiment in that it is fabricated out of a single piece of material and may be fabricated using the same tools, length, hole, angle dimensions, as well as installation methods. It differs in a plurality of places comprising the bight 69 is straight similar to the first embodiment, and the material is flat instead of round, and the flattening of the tube material would not need to be done. The seventh embodiment may be fabricated with a round bight section.

FIG. 24 shows an eighth embodiment that is very similar to the seventh embodiment. There are a plurality of differences comprising two pieces of material that conform to each other in the bight 69, inner leg portions 61 are coupled to the inside of the handles 88 and 92 (shown in FIG. 1) in the first and second handle/leg coupling sections 94 (shown in FIG. 1) and 95 (shown in FIG. 5). Outer leg portions 62 are coupled to the outside of the handles 88 and 92 (shown in FIG. 1) in the first and second handle/leg coupling sections 94 (shown in FIG. 1) and 95 (shown in FIG. 5). The two pieces are coupled together in a bight/leg coupling area 200 although those of ordinary skill in the art will recognize that other methods of fastening the pieces together such as riveting, welding, etc. The material lengths, bend angles, hole diameters, and fabrication methods used to fabricate the seventh embodiment are very similar.

FIG. 25 shows a ninth embodiment of the pivot bracket 50 made of a single piece of material and is very similar to the first embodiment with a plurality of differences comprising its method of manufacturing, the materials used, etc. All of the finished product boundaries identified for the first embodiment may be used for this embodiment including length, width, material thickness, hole characteristics, angles, etc.

Fabrication

The ninth embodiment may be 3-D printed, although those of ordinary skill in the art will recognize that other suitable means of fabricating such as casting, injection molding, molding, etc. are possible. 3-D printing may fabricate the pivot bracket out of plastics, although those of ordinary skill in the art will recognize that other suitable materials may be used such as ABS, resins, polyamide, etc., metals such as stainless steel and aluminum, etc. and ceramics, etc. . . . Molding and casting may use materials like plastics, although those of ordinary skill in the art will recognize that other suitable materials may be used such as aluminum, fiberglass reinforced plastic, etc. Installation and operations are the same as the first embodiment.

FIGS. 27, 28, 29, 30, and 31 show cross-sectional views of the support legs 52 or 54 (shown in FIG. 2) and the bight 69 and the bight lower edge or surface 73. FIG. 27 is a modified C-shape, FIG. 28 is a straight-shape, FIG. 29 is an L-shape with an orientation that is angled back, FIG. 30 is an L-shape that is the cross-section shown in the first embodiment shown in FIG. 1. FIG. 31 is a half-circle shape. These are some of the possible shapes for the bight 69 cross-section, however those of ordinary skill in the art will recognize that other suitable shapes may work.

FIGS. 32, 33, 34, 35, 36, 37, 38, 39, 40, and 41 are cross-sectional views of solid handles 88 and 92 (shown in FIG. 1) at the handle/leg support section 95 (shown in FIG. 5) and 94 (shown in FIG. 1). FIG. 32 shows a cross-section of round material 202 for the support leg at the leg/handle coupling section 63 and 64 and a cross-section of round support leg at leg/handle coupling section 203. FIG. 33 shows cross-section of rectangle support leg at a leg/handle coupling section 204 and cross-section of rectangle support leg at a leg/handle coupling section 205. There are different orientations that the U cross-section shape 115, and the L cross-sectional shape 74, for the leg/handle coupling section 63 and 64 sections of the support legs 52 and 53 (shown in FIG. 2) can be coupled to the handle/leg coupling sections 94 (shown in FIG. 1) and 95 (shown in FIG. 5). FIG. 34 shows the L cross-section 74 adjacent to a right handle surface 208 and a top handle surface 207, FIG. 35 shows the L cross-section 74 adjacent to a right handle surface 208 and a bottom handle surface 206, FIG. 36 shows the L cross-section 74 adjacent to a left handle surface 209 and the bottom handle surface 206, FIG. 37 shows the L cross-section 74 adjacent to the left handle surface 209 and the top handle surface 207.

The U cross-section that may be used for the support legs 52 and 53 in the first embodiment may be mounted on any three adjacent sides. FIG. 38 shows the U cross-section 115 used for the support legs in the first embodiment with the center-section coupled to the top handle surface 207. FIG. 39 shows the U cross-section 115 with the center-section coupled to the left handle surface 209, FIG. 40 shows the U cross-section 115 with the center-section coupled to the bottom handle surface 206, FIG. 41 shows the U cross-section 115 with the center-section coupled to the right handle surface 208.

Figure 42:
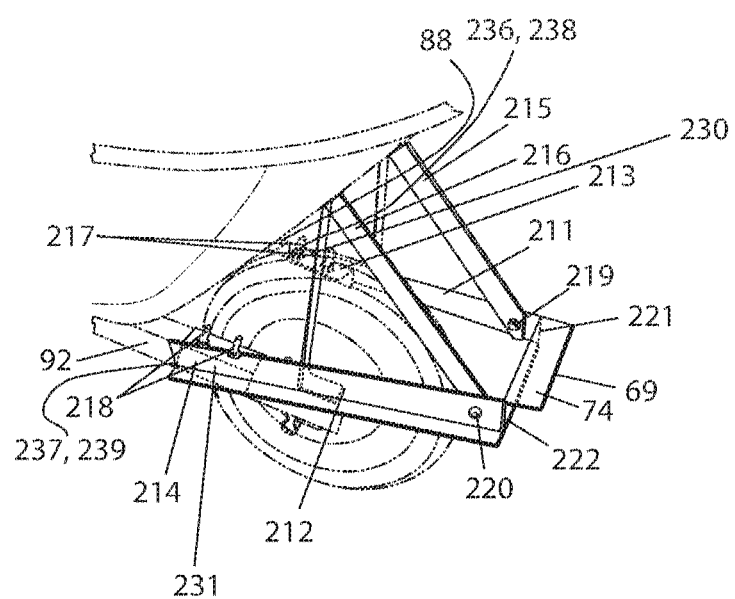
FIG. 42 shows a partial side perspective of the front of a wheelbarrow showing the eleventh embodiment of a pivot bracket mounted on a wheelbarrow.

FIG. 42 shows the eleventh embodiment made out of a plurality of sections very similar to the second embodiment (shown in FIG. 9) that incorporates connection struts 150. However, the eleventh embodiment is coupled to the handles 88 and 92 behind the axle and may overlap the handle/leg coupling section 95 and 94 (shown in FIG. 18) used in the first ten embodiments. A first alternative coupling section 230 and a second alternative coupling section 231 may be an option for other pivot bracket 50 embodiments. The alternative coupling sections 230 and 231 are located in a range and defined by a range, on both the handles 88 and 92, that is defined on the forward end by a plane that runs through the rotational axis 132 (shown in FIG. 5) and is perpendicular to the front and back direction longitudinal axis of handle 88 and 92 to 20 cm behind the forward location. A first leg/handle coupling bracket 213 and a second leg/handle coupling bracket 214 may attach to a single or plurality of longitudinally oriented surfaces of the handles 88 and 92 as shown in, but not limited to, FIGS. 32, 33, 34, 35, 36, 37, 38, 39, 40, and 41.

The eleventh embodiment of the pivot bracket 50 formed as the L cross-sectional shape 74 and is preferably made of metal material, such as iron, steel, aluminum, etc., although those of ordinary skill in the art will recognize that other suitable materials may be used, such as glass reinforced plastic, carbon fiber, or plastic. The L cross-sectional shape is used, although those of ordinary skill in the art will recognize that other shapes are suitable such as, but not limited to, the U cross-sectional shaped member 115 (shown in FIGS. 38, 39, 40, and 41) may be used. There are a plurality of parts and sections comprising the first leg/handle connection bracket 213, a first support leg 211, a first connection strut 215, the bight 69, a second connection strut 216, a second support leg 212, the second leg/handle connection bracket 214. The lengths, widths, thicknesses, and hole specifications for the parts are the same as the first embodiment with the exception of the lengths of the support legs 211 and 212 (including the portion that includes the connection brackets 213 and 214). Their length may range from 25 cm to 65 cm. The support legs 211 and 212 are coupled to the connection brackets 213 and 214. The angle range of the connection bracket relative to the connection strut, is minus 5-deg to plus 15-deg, is measured between the longitudinal axis of the handles 88 and 92 and the longitudinal axis of the support legs 211 and 212. The support legs 211 and 212 are coupled to the bight 69 at a first support leg/bight connection section 221 and a second support leg/bight coupling section 222. The connection struts are connected to the support legs as described for the second embodiment.

Fabricating an example of the eleventh embodiment may be done by those of ordinary skill in the art. Example specifications and fabrications methods for one version of the pivot bracket 50 of this embodiment comprising the connection brackets needing two pieces use 3.8 cm by 5 cm by 0.3175 cm angle iron 12 cm long. Support legs requiring two pieces of angle iron 2.5 cm by 2.5 cm by 0.3175 cm by 45 cm, bight 69 requiring one piece of angle iron 2.5 cm by 2.5 cm by 23 cm, connection strut requiring two pieces 2.5 cm by 0.476 cm by 27 cm long including 3.8 cm for the flange 151 (shown in FIG. 13). The individual pieces may be cut to length by a machine such as a metal shear. The holes 96 are created in the connection brackets 213 and 214 on one of the faces by a tool such as a drill press. The holes 96 for this example will be 0.95 cm in diameter and are 1.9 cm in from each of the cut edges on the longitudinal centerline of the brackets. As described above in the pivot bracket 50 second embodiment the holes 96 are created in the leg/bight connection section 221 to couple the support legs 212 and 211 to the connection struts 215 and 216, as well as in the connection struts 215 and 216.

Physically coupling the pieces together for the eleventh embodiment may comprise of the connection bracket 213 being oriented with outside surface with holes oriented up, have the support legs 211 outside surface against non-holed outside surface of the connection bracket 213, and a first support leg lower angle corner 238 positioned to align with a first back lower connection bracket corner 236 (shown in FIG. 42). Once aligned, the pieces are welded together. The connection bracket 214 is oriented with outside surface with holes oriented up, have the support leg 212 outside surface against non-holed outside surface of the connection bracket 214, and a first support leg lower angle corner 239 positioned to align with a second back lower connection bracket corner 237 shown in FIG. 42. The connection brackets 213 and 214 and the support legs 211 and 212, for this example, have a 10-deg angle. Once aligned pieces are welded together. The connection brackets 213 and 214 are clamped to the handles 88 and 92 in the first alternative handle/leg coupling area 230 for the connection bracket 213 and the second alternative handle/leg coupling area 231 for the connection bracket 214. The bight 69 is clamped in place in the first support leg/bight connection section 221 and the second support leg/bight connection section 222 as shown in (shown in FIG. 42) and the bight 69 and the support legs 211 and 212 are welded together in the support leg/bight connection sections 221 and 222. Holes in the connection brackets 213 and 214 are marked on the handles 88 and 92 and holes drilled in handles 88 and 92 to 0.95 cm dia. with a tool such as a drill. The pivot bracket 50 and connection struts are finished as described in the first embodiment. Once finished the pivot bracket is installed to the handles 88 and 92 using a first connection brackets fastener 217 and a second connection brackets fastener 218 such as 0.9 mm×5 cm bolts and lock nut and tightened to fastener manufacturer specifications, although those of ordinary skill in the art will recognize that other fastening materials may be suitable. Connection struts are installed as described in the second embodiment.

Figure 17:
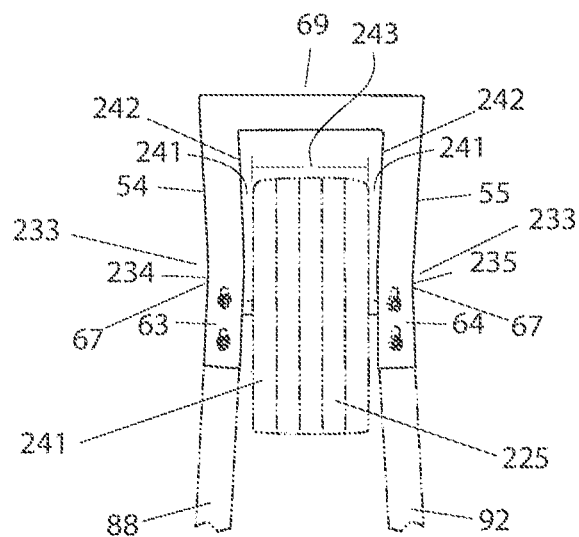
FIG. 17 shows an overhead view of the front section of a wheelbarrow showing partial handles, the tire, and the twelfth embodiment of the pivot bracket.

FIG. 17 shows a twelfth embodiment that is very similar to the first embodiment, with the difference being the pivot bracket is fabricated to accommodate wider wheels. The wheelbarrow industry standard wheel is 40.1 cm+/−10% in diameter by 10.2 cm in width +/−10%. Wheelbarrow manufacturers specify wheel/tires 241 that are 15 cm+/−10% on some of their models for reasons comprising carrying heavier weights or using on sensitive surfaces such as golf courses. To adapt the first embodiment to allow for a wider tire 225, the support legs 54 and 55 would have an outwards inclination 233 ranging between 5-deg and 15-deg measured on the longitudinal axis of the support leg/bight section 54 and 55 and the longitudinal axis of the leg/handle coupling section 63 and 64 forward of the leg/handle coupling sections 63 and 64. The outward inclination 233 would be located in a first outward compound bend area 234 and a second outward compound bend area 235 forward of the leg/handle coupling sections 63 and 64.

Fabricating the support legs 54, 55 described in the first embodiment with the upward incline angle in the upward incline transition section 67 as well as the outward inclination 233 may be with a compound bend. Fabricating the support legs 54 and 55 as described in the first embodiment and then putting them in a jig and pressing the outwards incline 233 angle with a hydraulic press is one way to achieve the compound bend, although those of ordinary skill in the art will recognize that other suitable methods may be used to form the compound bend. The width of the bight 69 and the outwards inclination angle are governed by a width 241 between widest point 243 of the tire and the inside edge 242 of support legs 54, 55. The width 241 range of distance is 0.75 cm to 2.5 cm+/−15%. Fabricating, finishing, and installation of this embodiment may be the same as the first embodiment.

Figure 18:
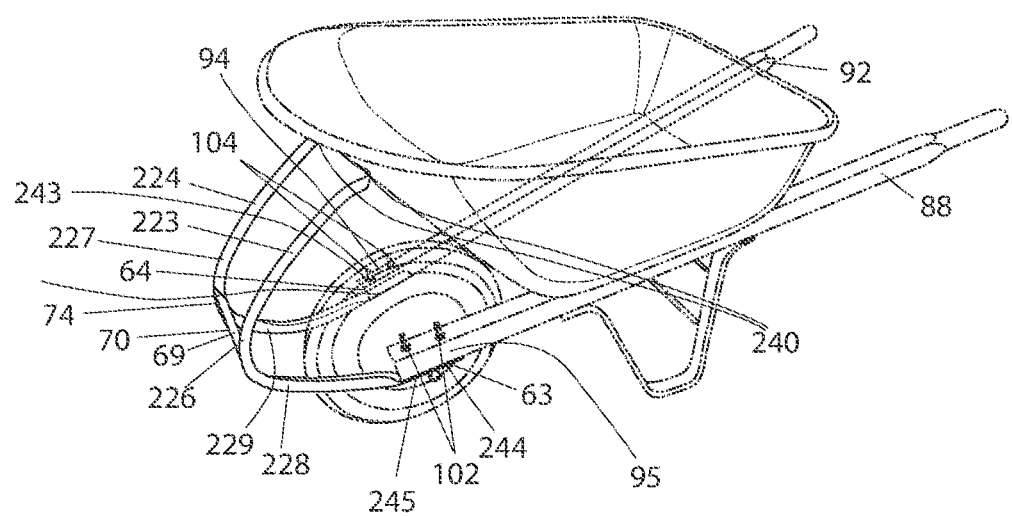
FIG. 18 shows a side perspective of a wheelbarrow with the thirteenth embodiment of the pivot bracket.

FIG. 18 shows a thirteenth embodiment that positions the bight 69 in the range of location 120 in a different way than prior embodiments. As with all pivot bracket 50 embodiments, the handles 88 and 92 must be specified to the correct length for new wheelbarrow manufacturing, or in retrofit installations, if needed, adjusted so they are the correct length as described in the first embodiment. This embodiment combines a first support leg section 228 and a first connection strut section 223 into a first pivot bracket leg 226 which are fabricated out of a single piece of material. A second support leg section 229 and a second connection strut section 224 into a second pivot bracket leg 227 which are fabricated out of a single piece of material.

The first leg/handle coupling section 63 is coupled to the first handle/leg coupling section 95 of handle 88. The second leg/handle coupling section 64 is coupled to the second handle/leg coupling section 94 of the handle 92.

An upper connection strut section flanges 240 are connected to the wheelbarrow tray face 173 in the strut tray connection range 171 (shown in FIG. 16).

The bight 69 is located between the pivot bracket legs 226 and 227 positioning the bight lower forward edge center 70 in the range of location 120 (shown in FIGS. 5 and 6).

Fabricating the thirteenth embodiment is similar to the construction of the sixth embodiment of the pivot bracket 50 (shown in FIG. 22). The pivot bracket legs 226 and 227 are constructed out of a round metal material, although those of ordinary skill in the art will recognize that other suitable materials may be used, such as glass reinforced plastic, carbon fiber, or plastic as well as other shapes are suitable such as, but not limited to, the U cross-sectional shaped member 115 (shown in FIGS. 38, 39, 40, and 41). The shapes may be solid or hollow. The bight 69 formed as the L cross-sectional shape 74 and is preferably made of metal material, such as iron, steel, aluminum, etc., although those of ordinary skill in the art will recognize that other suitable materials may be used, such as glass reinforced plastic, carbon fiber, or plastic. Other shapes are suitable such as, but not limited to, the U cross-sectional shaped member 115 (shown in FIGS. 38, 39, 40, and 41) and shapes may be solid or hollow.

An example of one way to build the thirteenth embodiment has specifications comprising two pieces of hollow metal tube having a 2.95 cm outside diameter and a wall thickness of 0.124 cm that are 76 cm long. A bight 69 cut out of a piece of angle iron that is 3.8 cm by 3.8 cm by 0.3175 cm that is 7.5 cm long. One end, 13 cm long, of the hollow metal tube, on both pieces, will need to be flattened to create the first and second leg/handle connection sections 95 and 94 with a hydraulic press or other suitable tool. The other ends, 6 cm long, will need to be flattened at an orientation of 90 degrees relative to the leg/handle connection sections 95 and 94 with a hydraulic press or other suitable tool to create the upper connection strut section connection flanges 240. A plurality of holes will need to be put into the leg/handle connection sections 95 and 94 aligning with the centerline axis of the flattened section of the leg/handle connection sections 95 and 94 and 6 cm apart with one hole in 2.5 cm from the end of the leg/handle connection sections 95 and 94, for this example the holes should be 0.95 cm in diameter. Another hole in each of the strut flanges needs to be created, for this example, the holes should be 0.95 cm in diameter. The hole should be centered relative to the flat section longitudinal axis and in 3 cm from the end.

C-shaped bends will need to be put into the metal tubes to approximate the shape of the pivot bracket section shape 226 (shown in FIG. 18) with a tool such as a Hossfeld Bender +/−30%. To properly align the strut flange to the wheelbarrow tray forward face 173 in the strut tray connection range 171 (shown in FIG. 16) the strut flanges 240 will need to be custom formed with a tool such as a vice and the operators arm. For this example, the strut flanges will be initially bent to, approximately 90 degrees before the final fitting.

To install this embodiment the axle connector fasteners 102 and 104 should be removed and the flattened section of the leg/handle coupling sections 95 and 94 placed between an axle bracket 244 and the bottom surface of the handles 88 and 92. The axle connector fasteners 102 and 104 should be replaced and tightened to manufacturer's specification. The strut flange should be fastened as described above for the second embodiment (shown in FIG. 9).

As used herein, directional terms such as, but not limited to, "forward," "back," "upper," "lower," "above," "below," "upward," "downward" and other like descriptions correspond to the orientation of the wheelbarrow from the perspective of a user standing at the handle portion looking towards the tray—that is the normal position an operator would occupy to move the wheelbarrow. Such directional terms are not limiting upon the claims.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

Further Embodiments and Considerations

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A connection strut for a wheelbarrow having two handles with corresponding forward end sections, at least one wheel rotatable around a rotational axis, a pivot bracket joining the two handle forward end sections in front of the at least one wheel and a cargo carrying tray, wherein:

the pivot bracket comprises spaced first and second support legs with a bight joined therewith, each of the first and second support legs having a forward end portion and a back end portion, wherein the back end portions of the first and second support legs are designed and configured to be attached to the forward end sections of the handles, and wherein at least a portion of the bight is located between the forward end portions of the first and second support legs;

the bight is designed and configured to be located forward and above the rotational axis of the wheel when the pivot bracket is installed on the wheelbarrow and the wheelbarrow is resting on a flat level surface without being tilted forward;

said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow;

the cargo carrying tray is mounted above the handles; and the connection strut comprises an elongate member configured to be mounted between the pivot bracket and a forward surface of the cargo carrying tray to provide a connection between the pivot bracket and forward surface of said tray.

2. The connection strut of claim 1, wherein said connection strut is configured and dimensioned to connect the upper forward portion of the cargo carrying tray to the pivot bracket at a point forward of the transition section.

3. The connection strut of claim 2, wherein the connection struts are configured and dimensioned to transfer load in the cargo carrying tray to the forward end portion of the pivot bracket when wheelbarrow is being tipped or emptied.

4. The connection strut of claim 2, wherein the elongate members of the connection struts have opposed ends with each end forming an attachment flange.

5. The connection strut of claim 4, wherein a body portion of the elongate members between the attachment flange has a structural shape configured to resist bending.

6. The connection strut of claim 5, wherein the connection struts have a cross section configured as a flat, square or round shape.

7. A kit for altering load carrying characteristics of a wheelbarrow having two handles with corresponding forward end sections, at least one wheel rotatable around a rotational axis, a pivot bracket joining the two handle forward end sections in front of the at least one wheel and a cargo carrying tray mounted above the handles, said kit comprising:
a pivot bracket with spaced first and second support legs with a bight joined therewith, each of the first and second support legs having a forward end portion and a back end portion, wherein the back end portions of the first and second support legs are designed and configured to be attached to the forward end sections of the wheelbarrow handles, and wherein:
at least a portion of the bight is located between the forward end portions of the first and second support legs;
the bight is designed and configured to be located forward and above the rotational axis of the wheel when the pivot bracket is installed on the wheelbarrow and the wheelbarrow is resting on a flat level surface without being tilted forward;
said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow; and
connection struts comprising an elongate member configured to be mounted between the pivot bracket and a forward surface of the cargo carrying tray to provide a connection between the pivot bracket and forward surface of said tray.

8. The kit of claim 7, wherein said connection struts are configured and dimensioned to connect the upper forward portion of the cargo carrying tray to the pivot bracket at a point forward of the transition section.

9. The kit of claim 8, wherein the connection struts are configured and dimensioned to transfer load in the cargo carrying tray to the forward end portion of the pivot bracket when wheelbarrow is being tipped or emptied.

10. The kit of claim 8, wherein the elongate members of the connection struts have opposed ends with each end forming an attachment flange.

11. The kit of claim 10, wherein a body portion of the elongate members between the attachment flange has a structural shape configured to resist bending.

12. The connection struts of claim 11, wherein the connection struts have a cross section configured as a flat, square or round shape.

13. A method of altering load carrying characteristics of a wheelbarrow having two handles with corresponding forward end sections, at least one wheel rotatable around a rotational axis, a pivot bracket joining the two handle forward end sections in front of the at least one wheel and a cargo carrying tray mounted above the handles, said method comprising:
installing a pivot bracket on the wheelbarrow, the pivot bracket having spaced first and second support legs with a bight joined therewith, each of the first and second support legs having a forward end portion and a back end portion, wherein the back end portions of the first and second support legs are designed and configured to be attached to the forward end sections of the wheelbarrow handles, and wherein:
at least a portion of the bight is located between the forward end portions of the first and second support legs;
the bight is designed and configured to be located forward and above the rotational axis of the wheel when the pivot bracket is installed on the wheelbarrow and the wheelbarrow is resting on a flat level surface without being tilted forward;
said first and second support legs each have a forward section and a rearward section with the rearward section being the section designed and configured to be attached to the forward end section of the handles and the forward section being inclined upward from a transition section joining with the rearward section, and wherein said transition section is positioned to lie inside the radius of the wheelbarrow wheel when mounted to the wheelbarrow; and
installing a connection strut between a forward surface of the cargo carrying tray and the pivot bracket, wherein the connection strut comprises an elongate structural member configured to be mounted to the cargo carrying tray and to the pivot bracket to provide a connection therebetween.

14. The method of claim 13, wherein said connection strut is configured and dimensioned to connect the upper forward portion of the cargo carrying tray to the pivot bracket at a point forward of the transition section.

15. The method of claim 14, wherein the connection strut is configured and dimensioned to transfer load in the cargo carrying tray to the forward end portion of the pivot bracket when wheelbarrow is being tipped or emptied.

16. The method of claim 14, wherein the elongate members of the connection strut has opposed ends with each end forming an attachment flange.

17. The method of claim 16, further comprising attaching the connection strut by placing a mechanical fastener through corresponding holes in the attachment flanges, cargo carrying tray and pivot bracket.

18. The method of claim 16, further comprising attaching the connection strut by welding the attachment flanges to the cargo carrying tray and pivot bracket, respectively.

19. The method of claim 16, wherein a body portion of the elongate members between the attachment flange has a structural shape configured to resist bending.

20. The connection struts of claim 19, wherein the connection strut has a cross section configured as a flat, square or round shape.

\* \* \* \* \*